United States Patent
Myrah et al.

(10) Patent No.: US 9,172,754 B2
(45) Date of Patent: Oct. 27, 2015

(54) STORAGE FABRIC ADDRESS BASED DATA BLOCK RETRIEVAL

(75) Inventors: Michael G Myrah, Cypress, TX (US); Balaji Natrajan, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 13/460,115

(22) Filed: Apr. 30, 2012

(65) Prior Publication Data

US 2013/0290463 A1 Oct. 31, 2013

(51) Int. Cl.
*G06F 15/167* (2006.01)
*H04L 29/08* (2006.01)
*G06F 3/06* (2006.01)
*G06F 17/30* (2006.01)

(52) U.S. Cl.
CPC ............ *H04L 67/1097* (2013.01); *G06F 3/064* (2013.01); *G06F 3/065* (2013.01); *G06F 3/067* (2013.01); *G06F 3/0617* (2013.01); *G06F 3/0643* (2013.01); *G06F 17/30194* (2013.01)

(58) Field of Classification Search
CPC .................................................. H04L 67/1097
See application file for complete search history.

(56) References Cited

U.S. PATENT DOCUMENTS

| 2001/0037435 | A1* | 11/2001 | Van Doren ..................... 711/153 |
| 2002/0007445 | A1* | 1/2002 | Blumenau et al. ............ 711/153 |
| 2010/0115011 | A1 | 5/2010 | Callahan et al. |
| 2012/0011176 | A1 | 1/2012 | Aizman |

* cited by examiner

*Primary Examiner* — Hua Fan
(74) *Attorney, Agent, or Firm* — Hewlett-Packard Patent Department (57) ABSTRACT

Techniques for retrieving data blocks are provided. In one aspect, a storage fabric address of a controller associated with a data block is retrieved by a node. If the node is on the same storage fabric as the retrieved address, the data block may be retrieved over the storage fabric. In another aspect, a directory server maintains mappings of data blocks to storage fabric addresses of controllers associated with the data blocks. A request for the location of the data block includes the storage fabric address of the associated controller.

4 Claims, 7 Drawing Sheets

STORAGE FABRIC ADDRESS BASED DATA BLOCK RETRIEVAL

BACKGROUND

A distributed file system may distribute the data blocks that make up a file amongst storage devices that are controlled by different data servers. All of the data servers may be connected via a local area network. A directory server may maintain a list of files and the logical block address of each block of data corresponding to a file. The directory server may maintain the local area network address of all data servers that control storage devices which contain each block of data. In some cases, the blocks of data that make up a file may be replicated on several different data servers. In such cases, the directory server may maintain the local area network addresses of all data servers that control storage devices that contain each block of data.

A client application that wishes to retrieve a file may send a query to the directory server over the local area network to determine the local area network address of the data server(s) that contain the blocks of data that make up the file. For each block of data, the client application may open a connection to a data server over the local area network using the address retrieved from the directory server. The contents of the data block may be retrieved from the storage device controlled by the data server and then sent to the client application over the local area network.

DETAILED DESCRIPTION

A distributed file system allows for the data blocks that make up a file to be spread amongst storage devices controlled by different data servers. In addition, the data blocks may be replicated, such that the same data block may exist on storage devices that are controlled by different servers. Such distribution and replication may provide for improved file handling operations by providing multiple locations from which a block of data may be retrieved. In addition, the replication may protect against the unavailability of a data block due to the data server that controls the storage device containing the data block becoming unavailable.

For example, one currently popular form of a distributed file system is the Hadoop Distributed File System (HDFS). In one example implementation of the HDFS, each data block of a file is replicated on storage devices controlled by three different data servers. Two of the data servers may be contained in the same rack of data servers, while the third may be in a different rack. In some cases, the racks themselves may be geographically distributed. The data servers may be connected to a local area network. A directory server, referred to as a name server, may also be present on the local area network and keeps track of the local area network addresses for all of the data servers that contain each block of data. A client application may be an application that runs on a client node. A client node is a server that runs applications. In many cases, the client nodes may be combined with the data servers, such that the data server both controls associated storage devices and runs client applications.

In operation, a client application that wishes to access a file may send a request to the name server over the local area network to determine where the data blocks that make up the file are stored. The name server may then retrieve the local area network addresses of data servers that contain the data blocks. The client application may then retrieve a data block by establishing a connection with the data server over the local area network and requesting the data block. The data server may then return the data block over the local area network.

Although the system described above is operable, a problem arises in the efficient use of local area network bandwidth. In a typical data center that contains may data nodes and client applications running on client nodes, local area network bandwidth is a limited resource. The bandwidth available must be shared by all nodes on the local area network. The local area network may be used for many other actions, such as inter node communication, that are unrelated to the distributed file system. Thus, as more local area network bandwidth is used by the distributed file system, less bandwidth is available for all other users of the local area network. The reduction in bandwidth available may increase latency for not only distributed file system operation but for all other operations as well.

The techniques provided herein provide for a mechanism to remove some of the distributed file system's traffic from the local area network. In typical data centers, storage devices, such as hard disk drives, are connected to data servers over a storage fabric that is isolated from the local area network. For example, one such storage fabric is a Serial Attached Small Computer Systems Interface (SAS) fabric. There may be several independent storage fabrics within a data center. For example, all servers within a single rack may be connected to the same storage fabric, thus creating a separate storage fabric for each rack.

When a client node wishes to retrieve a block of data, the client may, just as before, send a request to a directory server to find the local area network address of the data server that controls a storage device that contains the block of data. However, in addition to returning the local area network address of the data server, the directory server may also retrieve the storage fabric address of the controller that controls the storage device containing the data block. If the client node and the data server are both connected to the same storage fabric, the client application may request the data block directly from the controller using the storage fabric. The controller may retrieve the data block and return it to the client over the storage fabric. Thus, both the transmission of the request and the actual data block occurs on the storage fabric, which reduces the amount of bandwidth used on the local area network. If the client node and the storage device are not on the same storage fabric, the data block may be retrieved as above, over the local area network.

Figure 1:
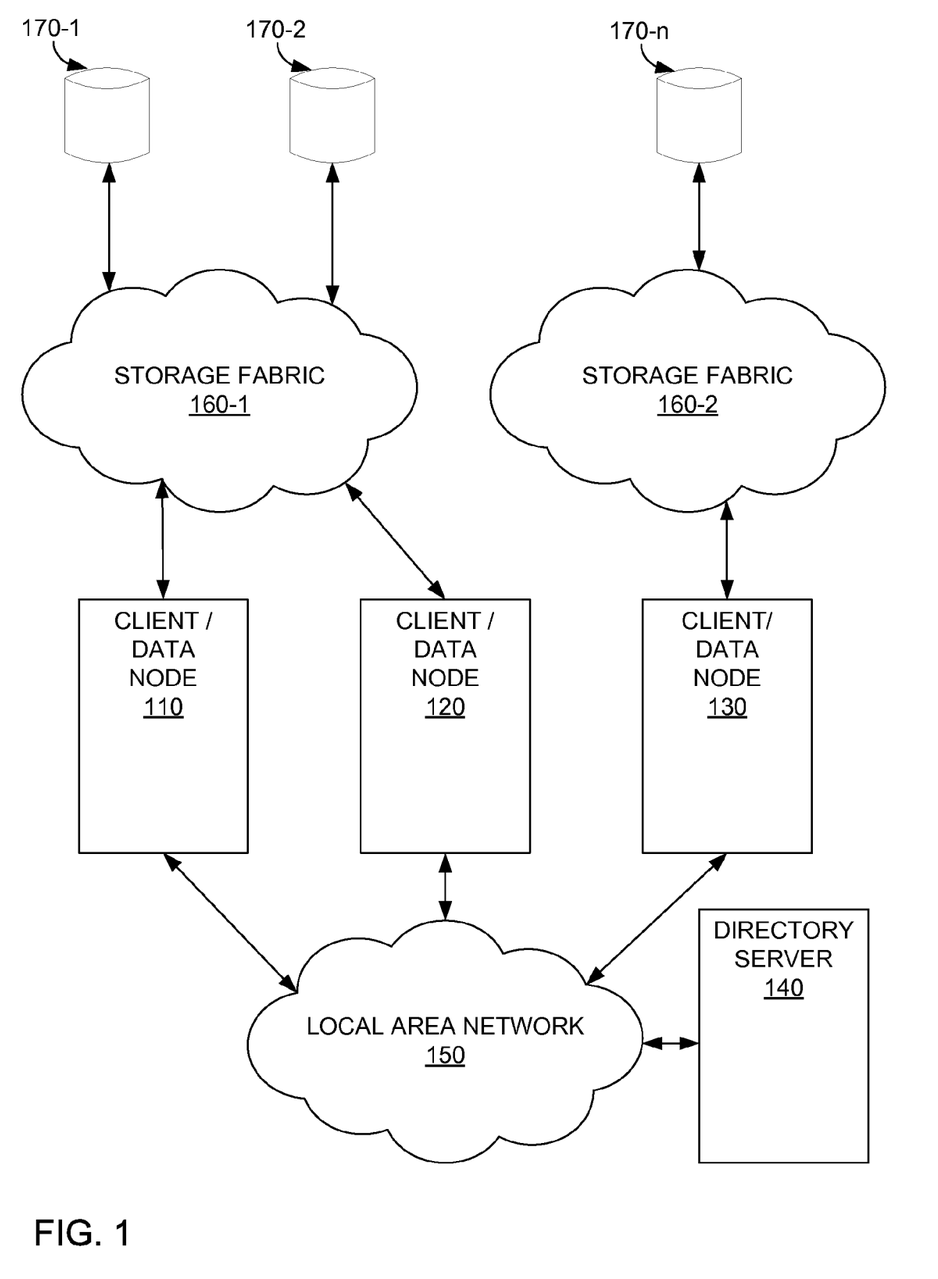
FIG. 1 depicts an example of a distributed file system.

FIG. 1 depicts an example of a distributed file system. The system may include client/data nodes 110, 120, 130. Although only three nodes are shown, this is for simplicity of description. There may be any number of nodes. The system may also include directory server 140. For purposes of description, only a single directory server is shown. However, the techniques presented herein are not limited to implementations with a single directory server. Connecting the client/data nodes and the directory server may be a local area network 150. The local area network may permit the client/data nodes and the directory server to communicate with each other.

The system may also include storage devices 170-1 . . . n. Storage devices may be of any type that is capable of storing blocks of data. For example, some typical storage devices may include hard disk drives, solid state disk drives, optical drives, tape drives, volatile and non-volatile random access memory, or any other type of storage device capable of block level storage. The storage devices may be connected to the client/data nodes over storage fabrics 160-1,2. The storage fabrics may allow for communications between any devices that are connected to the storage fabrics. As shown, all storage devices are not necessarily connected to all storage fabrics. For example, storage device 170-1 is connected to storage fabric 160-1, which in turn is connected to client/data nodes 110, 120. Thus, these devices may communicate over storage fabric 160-1. However client/data node 130 is not connected to storage fabric 160-1. As such, client/data node 130 does not directly communicate over storage fabric 160-1.

In operation, a client application running on one of the client/data nodes may wish to access a file. The client may access the directory server to determine what blocks of data make up the file. The directory server may return to the client a storage fabric address of the client/data node that is associated with a storage device that contains a block of data that is part of the file. The directory server may also include the local area network address of the client/data node that is associated with the storage device.

The client application may then determine if the client/data node that is running the client application is connected to the storage fabric that includes the storage fabric address returned by the directory server. If so, the client application may retrieve the block of data over the storage fabric. If not, the client application may open a connection to the client/data node over the local area network and retrieve the block of data over the local area network.

Figure 2:
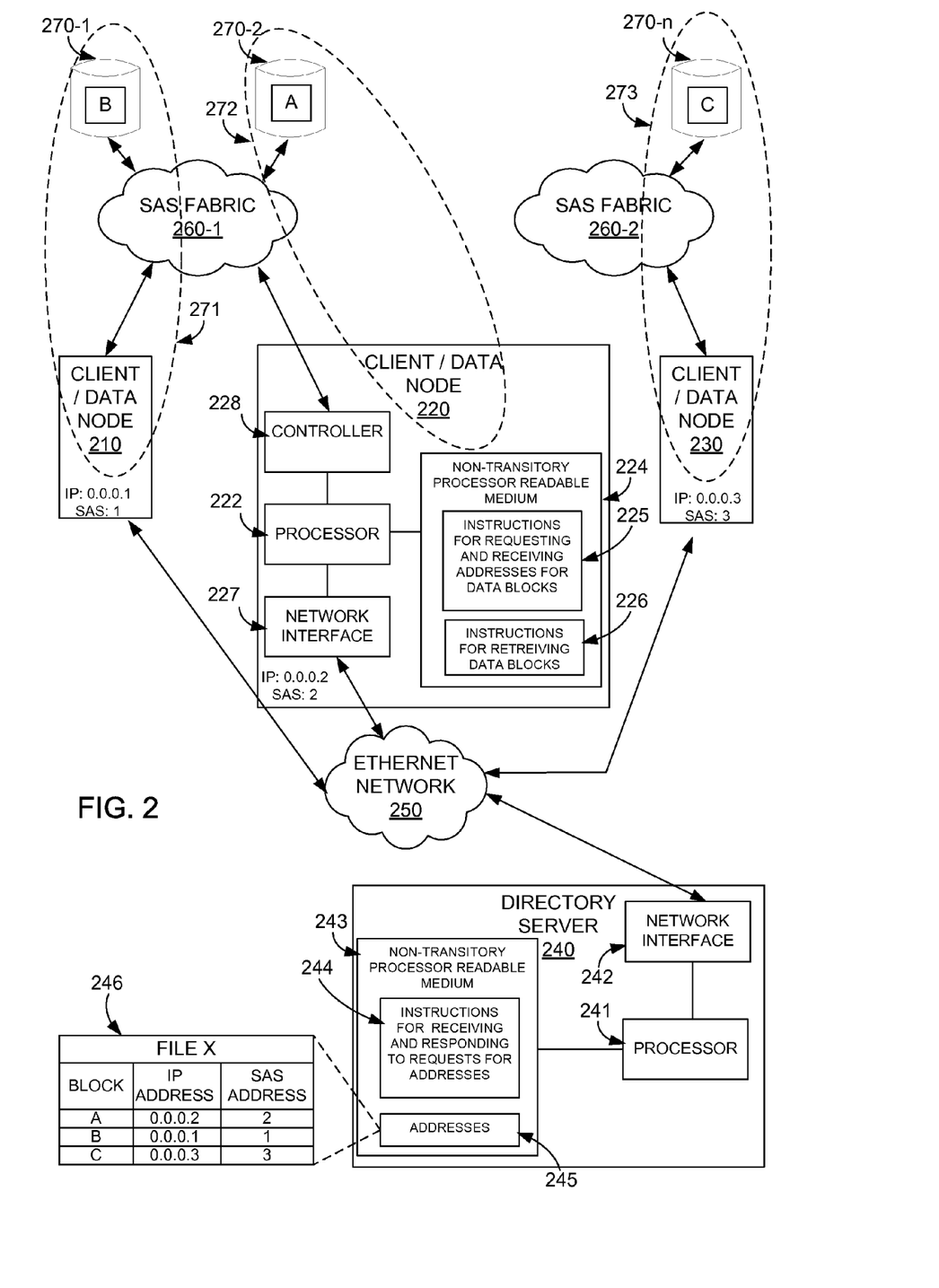
FIG. 2 depicts another example of a distributed file system.

FIG. 2 depicts another example of a distributed file system. The elements shown in FIG. 2 are generally the same as those in FIG. 1, with a little bit more detail depicted. Just as above, the system contains client/data nodes 210, 220, and 230. The system also contains directory server 240. The system also contains a local area network, which as shown is an Ethernet network 250. The system also contains storage fabrics, which as depicted are SAS storage fabrics 260-1,2. Connected to the SAS fabrics are storage devices 270-1 . . . n.

Client/data node 220 has been shown in greater detail than the other client/data nodes. However, it should be understood that the structure of the client/data nodes is generally the same. Client/data node 220 may contain a processor 222. The processor may be of any type that is suitable for use in a computer. Coupled to the processor 222 may be a non-transitory processor readable medium 224 which contains thereon a set of instructions which if executed by the processor cause the processor to perform the techniques described herein. For example, the medium may include instructions 225 for requesting and receiving addresses for data blocks. The medium may also include instructions 226 for retrieving data blocks. Operation of the processor executing these instructions will be described in further detail below.

Node 220 may also include a network interface 227. The network interface may allow the node to communicate with the local area network. For example, in the case of the Ethernet network 250 shown in FIG. 2, the network interface may be an Ethernet card. Communication with the network interface may be through a network address. As shown, in the case of an Ethernet network, the network address may be an IP address. Node 220 may also include a controller 228. The controller may include a storage fabric address which allows for communication with the controller over the storage fabric, which as shown is SAS fabric 260-1.

Connected to SAS fabrics 260-1,2 may be a plurality of storage devices 270-1 . . . n. As described above, there are many different types of storage devices. In some cases, several storage devices may be contained in a single enclosure and the enclosure is attached to the SAS fabric. Regardless of the particular form factor for the storage devices, communication with the storage devices occurs over the SAS fabric.

Storage devices are typically associated with a single controller that controls reading and writing data to the storage device. In order to enforce the single controller for a storage device, some SAS fabrics implement SAS zoning. When using SAS zoning, a controller is assigned to a zone group. Storage devices may also be assigned to a zone group. A controller communicates with storage devices that are in the same zone group as the controller. By only assigning a single controller to a zone group, it can be ensured that only that controller may read and/or write data directly to the storage device.

A controller and storage devices that are in the same zone group may be said to be associated with each other. Thus, when referring to a data block stored on a storage device, it may also be said that the data block is associated with the controller associated with the storage device. For purposes of description, three zone groups 271, 272, and 273 are shown. Storage devices and controllers within the same zone group may communicate directly. Thus, as shown, controller 228 may communicate with storage device 270-2 directly. However, controller 228 may not communicate directly with storage devices 270-1 and 270-n. It should be understood that there may be any number of zone groups.

Controllers in different client/data nodes may communicate with each other if they are attached to the same SAS fabric. For example, the controllers in nodes 210 and 220 are shown as being connected to SAS fabric 260-1, and thus may communicate with each other. However, the controller of node 230 is connected to SAS fabric 260-2. Thus, the controller in node 230 may not communicate with the controllers connected to SAS fabric 260-1.

Directory server 240 may also include a processor 241. The processor may be any type of processor suitable for use in a computer. Coupled to the processor may be a network interface 242. The network interface may allow for the directory server to communicate with the nodes over the network 250. In addition, the processor may be coupled to a non-transitory processor readable medium 243 which contains thereon a set of instructions which if executed by the processor cause the process to perform the techniques described herein. The medium 243 may include instructions 244 for receiving and responding to requests for addresses. Operation of the processor will be described in further detail below.

The directory server may also include addresses 245. As has been explained above, in a distributed file system, a directory server may maintain mappings of files to the data blocks that make up the file. Each data block is associated with a local area network address of a node that contains a controller in the same zone group as the storage device containing the block of data. The functionality of maintaining the data block to local area network address is part of typical distributed file systems. The techniques described herein modify the data block mapping to include an additional piece of data. In addition to the local area network address of a node, the directory server may also maintain the SAS fabric address of the controller associated with the node.

For purposes of description, an example of the address information 246 for a file is shown. File X may comprise three data blocks, labeled A, B, and C. For each of these data blocks, the local area network address, in this case an IP address, is stored. In addition, for each data block the storage fabric address of the controller, in this case the SAS fabric address, is also stored. In an example implementation, a block referenced by the directory server may not have a one to one mapping with a block on the storage device. A block as referenced by the directory server may actually map to several logical block addresses (LBA) on the storage device. The directory server may store the start LBA, the number of LBAs, and the logical unit number (LUN) of the storage device (not shown). Using this information, all of the logical blocks on a storage device that make up a block of data may be retrieved. It should be noted that for purposes of ease of description, only a single network address and storage fabric address is shown for each block of data. However, as described above, the same block of data may be stored on multiple storage devices and those blocks of data may be made up of more than one logical block address on the storage device. In such cases, the directory server will store addresses for all nodes and controller through which the data block is accessible as well as the information needed to retrieve all of the logical blocks that make up the block of data, including the LUN. The client/data node may then select how the data block is retrieved, as will be described below.

In operation, a client/data node may be running an application program. The application program may determine that it needs to retrieve a portion of a file. The application program may send a query to the directory server to retrieve the addresses of the portion of the file that should be retrieved. For example, an application program running on node 220 may determine that it needs to read data from file X. The application program may query the directory server to retrieve the locations of the data blocks that make up file X. In this case, file X is made up of blocks A, B, and C, which are stored in storage devices accessible by using the listed IP and SAS addresses.

In this example, assume that the application program wishes to retrieve the first block of the file. As shown, block A of the file is accessible via IP address 0.0.0.2 and SAS address 2. As node 220 is both running the application program and contains the controller associated with SAS address 2, the node may retrieve the data block directly using the controller.

A more interesting case is if the application program decides to retrieve data block B. As shown, data block B is associated with a controller whose associated IP address is 0.0.0.1 and SAS address is 1. These addresses may be received by the application program. The node 220 may then determine that it is connected to the same SAS fabric 260-1 as the controller which is associated with block B, based on the SAS fabric address. In other words, node 220 may examine the SAS fabric address, and based on the address is able to determine if the address is on the SAS fabric connected to node 220. In this example, the controller is on the same SAS fabric. As such, the controller on node 220 may send a request for the data block to the controller (not shown) on node 210 which is associated with block B. The request may be sent directly over the SAS fabric 260-1. The controller on node 210 may then return the data block B to node 220, again using the SAS fabric 260-1. As such, no bandwidth on the Ethernet network is used for requesting and transmitting the block of data.

The application program may then wish to retrieve block C of the file. As shown, block C is associated with IP address 0.0.0.3 and SAS address 3. In this case, the controller (not shown) of node 230 which is associated with block C is not on the same SAS fabric as node 220. In such cases, the application program will default to normal distributed file system techniques. In other words, node 220 will establish a connection with node 230 over the Ethernet network. Node 220 may request block C over the Ethernet network from node 230. Node 230 may retrieve block C using its controller. The node may then send block C back to node 220 over the Ethernet network. As such, the block of data is still retrieved, albeit without the benefits of offloading traffic from the local area network.

Although the description above has been presented in terms of reading a file, it should be understood that the same techniques are applicable when writing data to a file. When data is to be written to a file, a similar process may occur. Although the process may have different steps, the concepts described above may be used to minimize the amount of traffic over the local area network. In other words, process steps in a write operation that could be done using the storage fabric make use of the storage fabric. The local area network is used otherwise. As above, communication may occur directly to the controller if the controller is on the same storage fabric. If not, communication occurs over the local area network. For purposes of the remainder of this description, file read requests will be described. However, it should be understood that the same techniques may be applied to file write requests.

Figure 3:
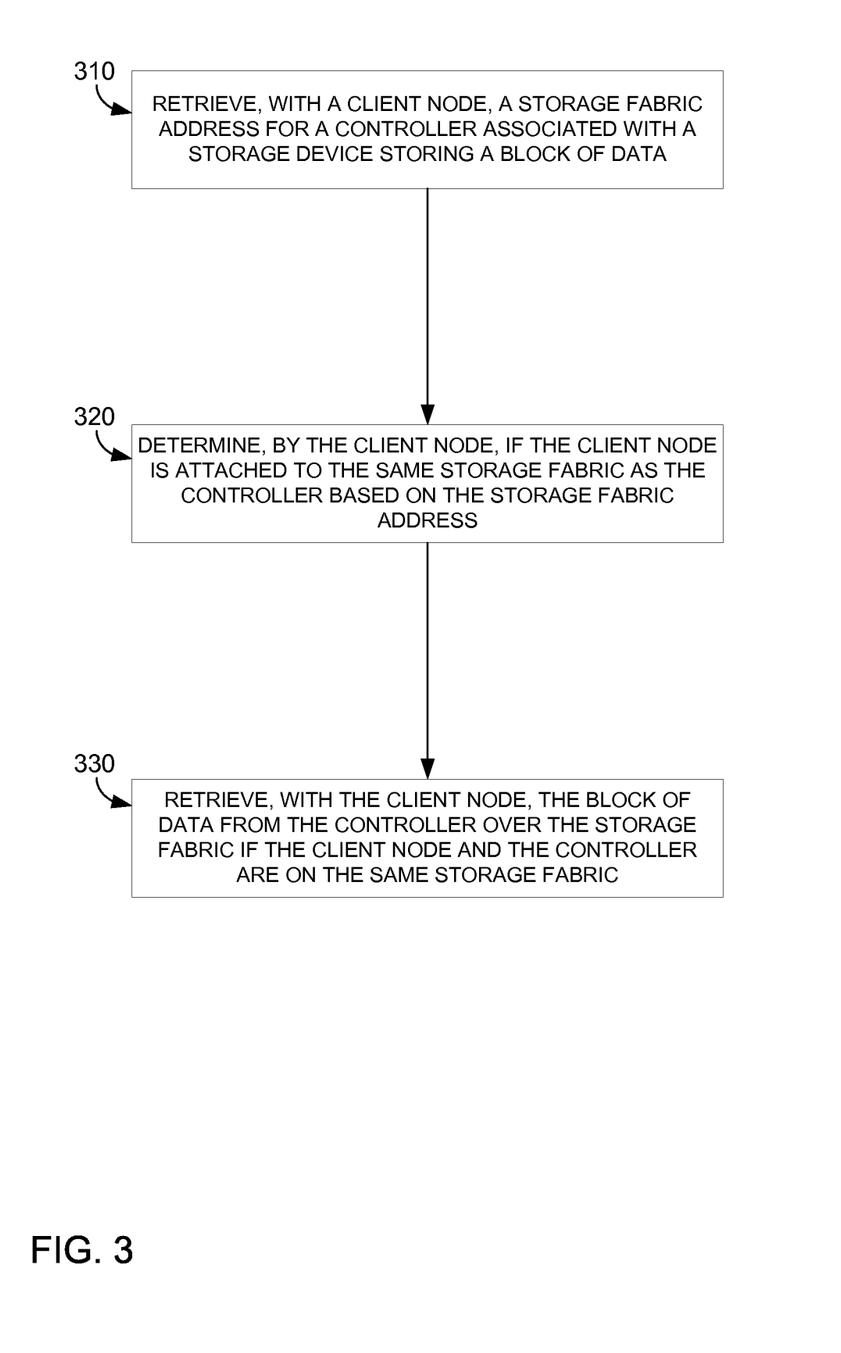
FIG. 3 depicts an example of a high level flow diagram for retrieving a data block.

FIG. 3 depicts an example of a high level flow diagram for retrieving a data block. In block 310 a client node may retrieve a storage fabric address for a controller associated with a storage device storing a block of data. For example, the client node may retrieve the SAS address of the controller which controls the storage device that contains the block of data of interest.

In block 320, the client node may determine if the client node is attached to the same storage fabric as the controller based on the storage fabric address. For example, the client node may examine the storage fabric address of the controller and determine if the client node's own controller is attached to the same SAS fabric, based on the storage fabric address.

In block 330, the client node may retrieve the block of data from the controller over the storage fabric if the client node and the controller are on the same storage fabric. In other words, if the client node is attached to the same storage fabric as the controller that controls the storage device containing the block of data, the client node may retrieve the block of data over the storage fabric, thus bypassing the local area network.

Figure 4:
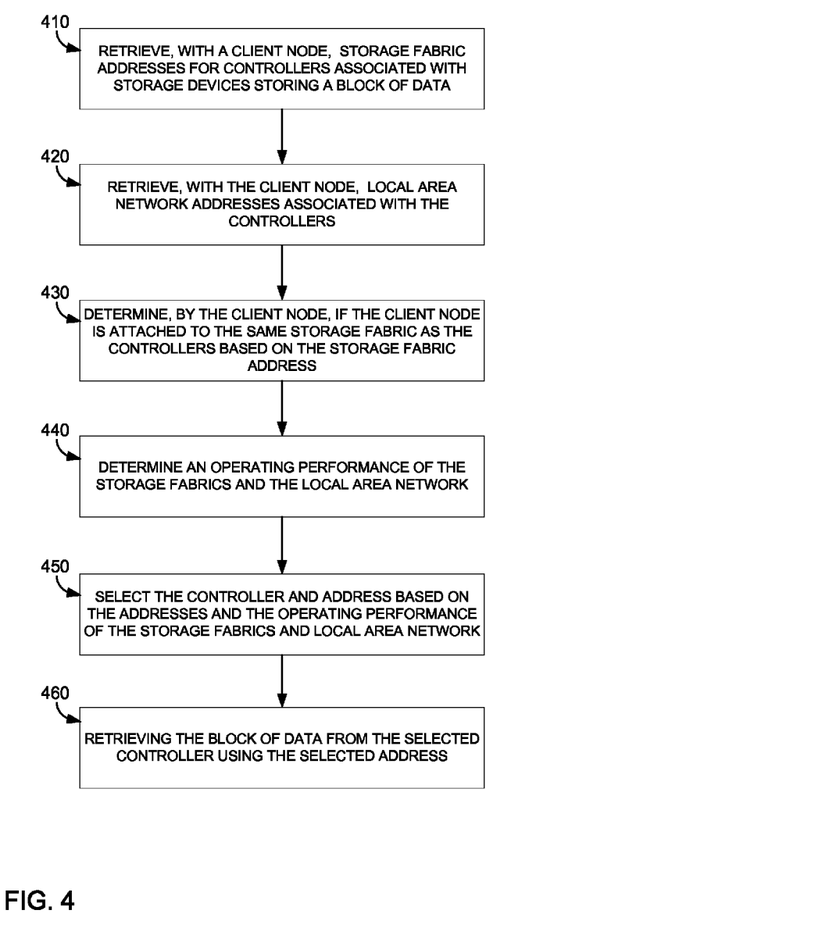
FIG. 4 depicts another example of a high level flow diagram for retrieving a data block.

FIG. 4 depicts another example of a high level flow diagram for retrieving a data block. In block 410, the client node may retrieve storage fabric addresses for controllers associated with storage devices storing a block of data. As described above, in replicated distributed file systems, copies of a block of data may be stored on multiple storage devices. In block 410, the storage fabric addresses of all the controllers associated with the storage devices may be retrieved.

In block 420 the client node may retrieve local area network addresses associated with servers associated with the controllers. As explained above, a block of data may be stored on storage devices associated with multiple servers. The local area network address for these servers may be retrieved in block 420. In block 430, the client node may determine if the client node is attached to the same storage fabric as the controllers based on the storage fabric address.

In block 440, the client node may determine an operating performance of the storage fabrics and local area network. For example, the client node may determine the latency of the local area network as an indicator of how loaded with traffic the local area network is. Similarly, the operating characteristics of the storage area networks may be determined.

In block 450, the client node may select the controller and address based on the addresses and the operating performance of the storage fabrics and the local area network. As explained above, in some cases, the client node may be able to access a block of data either over a storage fabric or the local area network. If the client node is connected to the same storage fabric as the controller of a storage device that contains the block of data, the client can retrieve the block of data using the storage fabric. If not, the client may use the local area network. In block 450, the client may select a controller based on the returned addresses. In some implementations, if the client node is able to retrieve the block of data using a storage fabric, the storage fabric will be selected.

In block 460, the block of data is retrieved from the selected controller using the selected address. If the storage fabric address was selected, the client node may send a request to the controller over the storage fabric and the controller may respond by sending the requested block of data to the client. If the local area network address was selected, the client node may open a local area network connection to the data server that contains the controller associated with the data block and the data block may be retrieved over the local area network connection.

Figure 5:
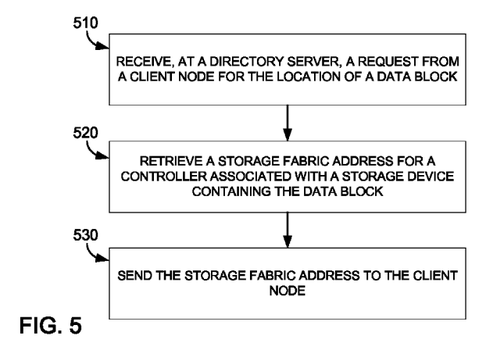
FIG. 5 depicts an example of a high level flow diagram of querying a directory server.

FIG. 5 depicts an example of a high level flow diagram of querying a directory server. In block 510 a directory server may receive a request from a client node for the location of a block of data. For example, the client node may send a request for the location of a file that is made up of data blocks. The request may include a request for the location of the storage devices that contain the data block.

In block 520, the directory server may retrieve a storage fabric address for a controller associated with a storage device containing the block of data. As mentioned with respect to FIG. 2, the directory server of a distributed file system is responsible for maintaining the locations of the data blocks that make up a file. In addition to storing the local area network address of the data servers that control storage devices containing a block of data, the directory server may also maintain the storage fabric address of the controllers. In block 530, the storage fabric address may be sent to the client node. The client node may then retrieve the block of data as described above.

Figure 6:
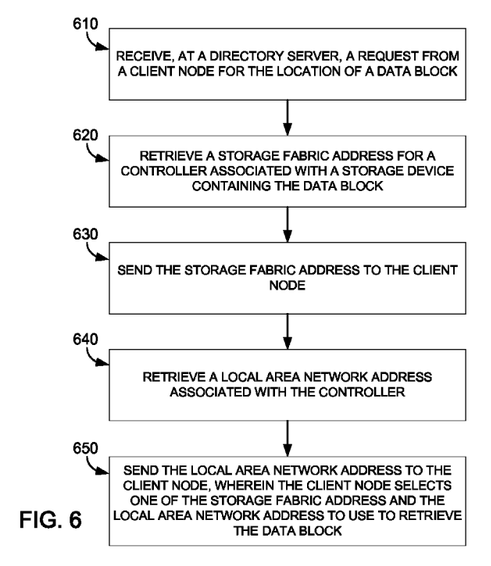
FIG. 6 depicts another example of a high level flow diagram of querying a directory server.

FIG. 6 depicts another example of a high level flow diagram of querying a directory server. In block 610, just as above, a directory server may receive a request from a client node for the location of a data block. In block 620 a storage fabric address for a controller associated with a storage device containing the data block may be retrieved. In block 630, the storage fabric address may be sent to the client node.

In block 640, a local area network address associated with the server associated with the controller may be retrieved. In block 650, the local area network address may be sent to the client node. As described above, the client node may select one of the storage fabric address and the local area network address to use to retrieve the data block. Although FIG. 6 describes separate block for sending the storage fabric address and the local area network address, it should be understood that these blocks may be combined into a single block. In other words, the directory server may retrieve both the storage fabric address and the local area network address associated with a controller and server, and send both addresses to the client node at the same time. The client node may then select which address to use, as described above.

Figure 7:
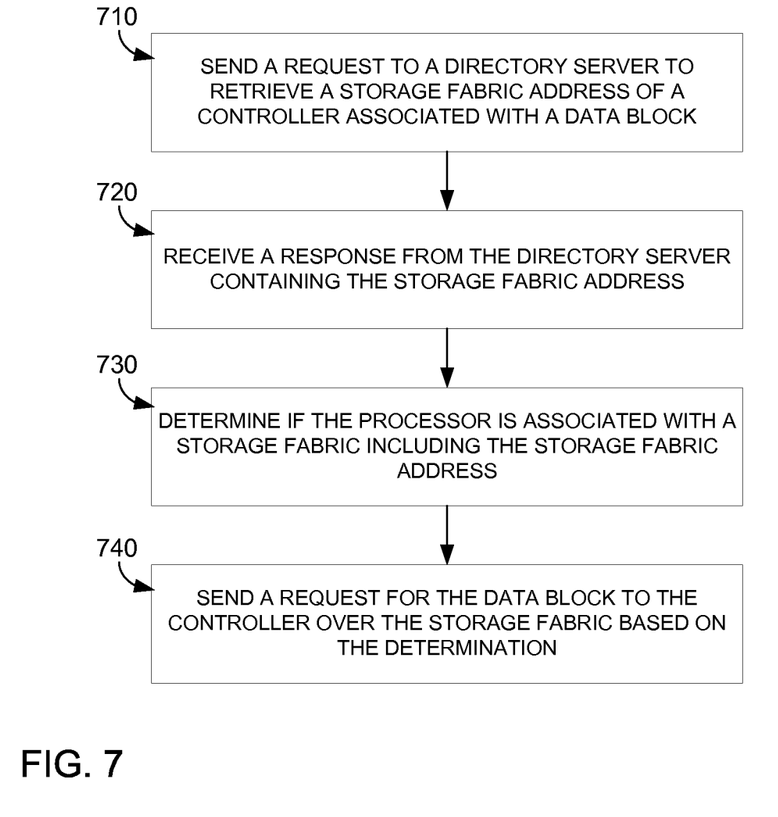
FIG. 7 depicts an example of a high level flow diagram of retrieving a data block.

FIG. 7 depicts an example of a high level flow diagram of retrieving a data block. In block 710 a request may be sent to a directory server to retrieve a storage fabric address of a controller associated with a data block. In block 720, a response may be received from the directory server containing the storage fabric address. In block 730 it may be determined if the processor that sent the request is associated with a storage fabric including the storage fabric address. In other word, it may be determined if the processor is connected to the same storage fabric as the controller of the storage device that contains the data block. In block 740, a request for the data block may be sent to the controller based on the determination. If the processor is determined in block 730 to be on the same storage fabric as the controller, the data block may be retrieved directly over the storage fabric, thus bypassing the local area network.

Figure 8:
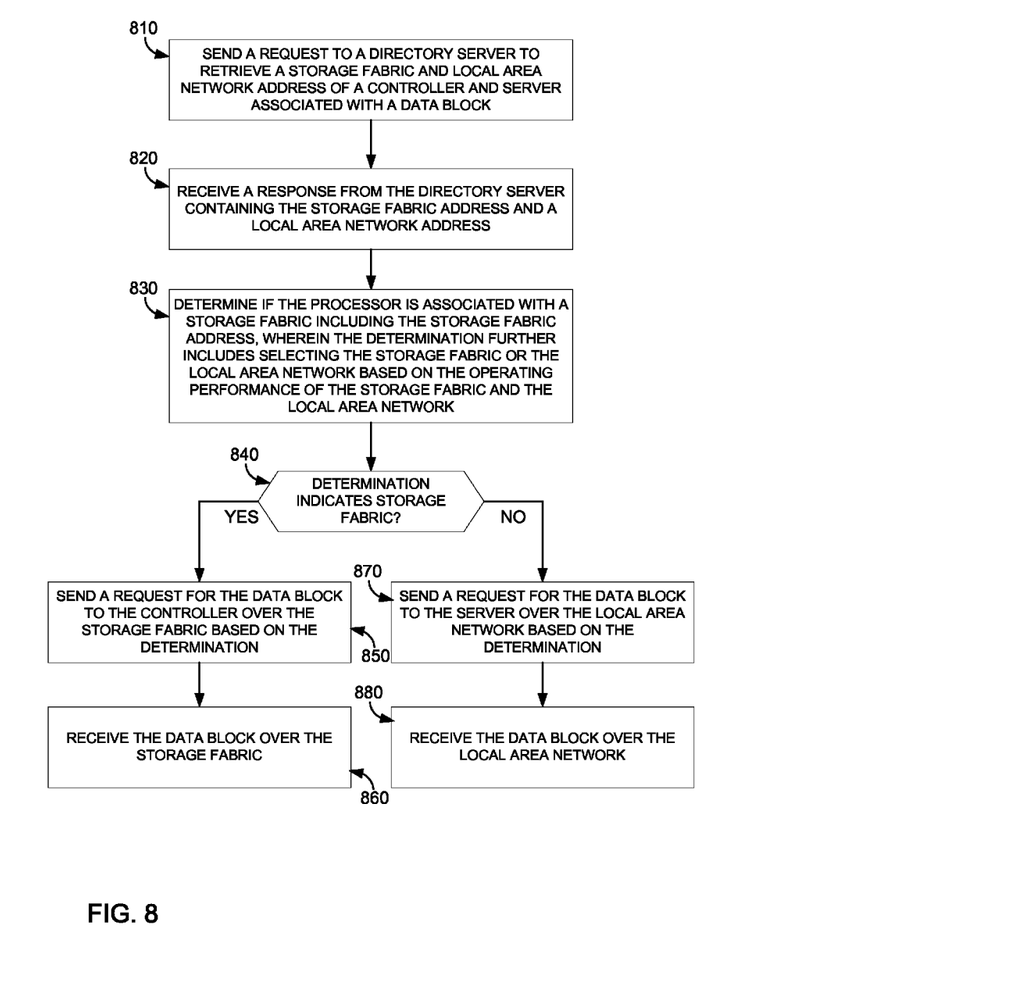
FIG. 8 depicts another example of a high level flow diagram of retrieving a data block.

FIG. 8 depicts another example of a high level flow diagram of retrieving a data block. In block 810 a request may be sent to a directory server to retrieve a storage fabric address and a local area network address of a controller and a server associated with a data block. In block 820, a response may be received from the directory server containing the storage fabric address and the local area network address.

In block 830, it may be determined if the processor is associated with a storage fabric including the storage fabric address, wherein the determination further includes selecting the storage fabric or the local area network based on the operating performance of the storage fabric and the local area network. As explained above, in some example implementations, the operating performance of the storage fabric is always considered better than the local area network, and will be selected whenever possible. In block 840, the result of the determination is examined. If the determination results in the storage fabric being selected, the process moves to block 850. Otherwise, the process moves to block 870.

In block 850, a request for the data block may be sent to the controller over the storage fabric based on the determination in block 840. In block 860, the data block may be received over the storage fabric. In block 870, a request for the data block may be sent to the server over the local area network based on the determination in block 840. In block 880, the data block may be received over the local area network.

We claim:

1. A method comprising:
  receiving, at a directory server, a request from a client node for the location of a data block;
  retrieving a storage fabric address for a controller associated with a storage device containing the data block;
  retrieving a local area network address associated with the controller; and
  sending the storage fabric address and the local area network address to the client node, wherein the client node selects one of the storage fabric address or the local area network address to use to retrieve the data block.

2. The method of claim 1 wherein the directory server is a Hadoop name node.

3. The method of claim 1 wherein the storage fabric is a Serial Attached Small Computer Systems Interface (SAS) fabric and the local area network is an Ethernet network.

4. A non-transitory computer readable medium containing thereon a set of processor readable instructions which if executed by a processor cause the processor to:

receive, at a directory server, a request from a client node for the location of a data block;
retrieve a storage fabric address for a controller associated with a storage device containing the data block;
retrieve a local area network address associated with the controller; and
send the storage fabric address and the local area network address to the client node, wherein the client node selects one of the storage fabric address or the local area network address to use to retrieve the data block.

* * * * *